F. C. MILLER.
WHEEL TIRE.
APPLICATION FILED JAN. 17, 1921.

1,392,433.

Patented Oct. 4, 1921.

UNITED STATES PATENT OFFICE.

FREDERICK C. MILLER, OF CHICAGO, ILLINOIS.

WHEEL-TIRE.

1,392,433.	Specification of Letters Patent.	Patented Oct. 4, 1921.

Application filed January 17, 1921. Serial No. 438,040.

*To all whom it may concern:*

Be it known that I, FREDERICK C. MILLER, a citizen of the United States, residing at Chicago, in the county of Cook and State of Illinois, have invented certain new and useful Improvements in Wheel-Tires, of which the following is a description.

My invention relates to improvements in wheel tires and more specifically to a device which may be substituted for the ordinary inner tube of a pneumatic tire, and which, while of a metallic structure, will be perfectly resilient and will perfectly absorb the road shocks given the vehicle upon which the wheel is mounted.

Another object of my invention is to provide a device as above described, which may be easily applied to or removed from the vehicle wheel whenever it is desired to do so, as for instance, for repairs, adjustments, etc.

Many other objects and advantages of the construction herein shown and described will be obvious to those skilled in the art from the disclosure herein given.

To this end my invention consists in the novel construction, arrangement, and combination of parts herein shown and described, and more particularly pointed out in the claims.

In the drawings, wherein like reference characters indicate like or corresponding parts;

Figure 1:
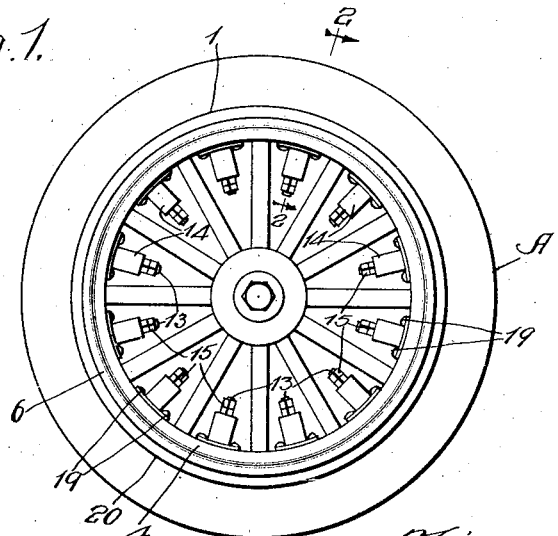
Figure 1 is a side elevation of my device as applied to a vehicle wheel.
Figure 2:
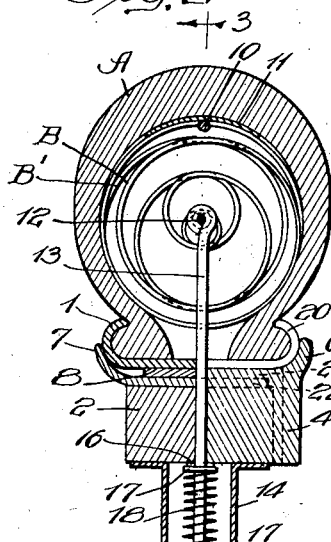
Fig. 2 is a section on the line 2—2 of Fig. 1, greatly enlarged.

A represents an outer casing or shoe of an automobile tire, said casing being made of rubber and fabric in the usual manner well known in the art, and is adapted to fit about the removable rim 1, as shown in Fig. 2, said rim being adapted to be mounted upon a felly 2, the felly 2 being notched radially as at 3 so as to coöperate with an annular locking ring 4 having radial tongues or projections 5 so proportioned and spaced that they may enter the notches or recesses 3 of the felly 2. If desired the locking ring 4 may have an upstanding flange 6 thereon adapted to coöperate with flange plates 7 and 8 so as to more securely hold the rim 1 in place upon the felly. Transverse locking bolts 9 extend through the felly 2 and the rings 4 and 8 at circumferential points about the felly, and securely hold the ring sections in place.

Figure 3:
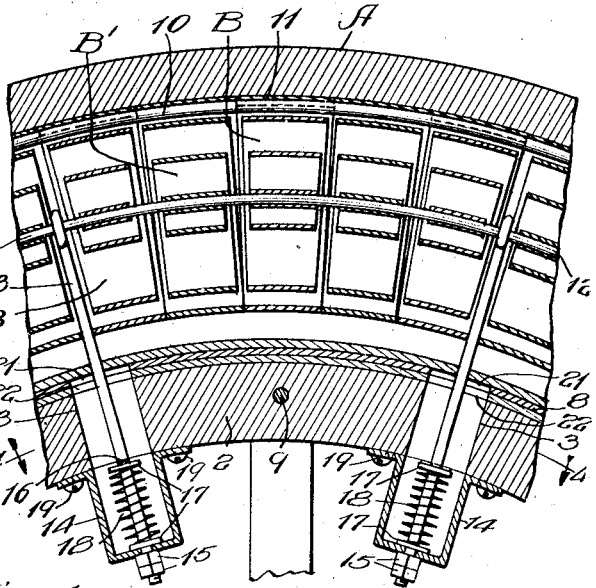
Fig. 3 is a section on the line 3—3 of Fig. 2.
Figure 4:
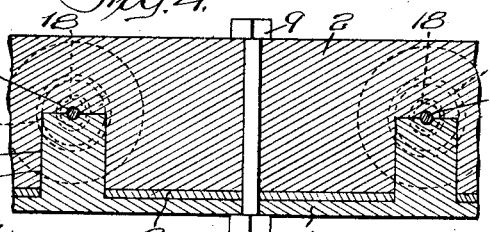
Fig. 4 is a section on the line 4—4 of Fig. 3.

Adapted to be positioned within the casing A is a resilient tire core, said core comprising an annular series of circumferentially arranged spiral coil springs B and B′, each of said springs being made of spring steel, or other suitable material, and preferably of flat metal tapered in width from end to end, the axes of the coils being perpendicular to the felly axis, that is, the springs are coiled in radial planes relative to the felly, adjacent springs being reversely coiled clockwise and counterclockwise, respectively, relative to each other and arranged so that adjacent tapered springs will lie in reversed directions, the outer free ends of adjacent springs extending in opposite directions, as shown in Fig. 3. The outer ends of the individual coils are secured to an outer circular supporting ring 10 by brazing, soldering, or in any other suitable or equivalent manner. There is preferably an annular sheath 11 of arcuate cross-section secured to and encircling the outer periphery of the ring 10 and the spring coils and adapted to bear against the inner periphery of the casing A and transmit the shocks therefrom. The inner ends of the coils are secured to a centering supporting ring 12, said centering ring having inwardly extending radial supporting rods or tie members 13 secured thereto at suitable intervals, as for instance, between each pair of spokes as in the embodiment shown.

The radial rods 13 are resiliently mounted so that they will maintain the tire against circumferential displacement and are yieldably mounted so as to allow an inward radial movement of the centering ring and its attached spring coils.

Stirrups or spring cages 14 are secured to the inner periphery of the felly 2 and are apertured at their ends so as to permit the rods 13 to slidably extend therethrough. Locking nuts or other suitable fastening means 15 are secured to the free ends of the rods 13 to limit their outward movement, these nuts abutting against the end of the stirrups. Cotter keys or other suitable transverse members 16 are secured to the rods so as to bear against the inner periphery of the felly and to further aid in limiting the outward radial movement of the rods.

Between the cotter keys 16 and the inner side of the stirrup ends are preferably positioned washers 17, said washers being adapted to act as end abutments for coil springs 18, said springs 18 having radially arranges axes encircling the rods 13. Screws or other equivalent means 19 extend through the base of the stirrups 14 and secure them to the felly.

Radial slots 20, 21, and 22 are provided in the members 1, 8, and 7 respectively at circumferential points thereabout whereby said members may accommodate the lateral movement of the rods 13 when the device is being removed. Thus it will be seen that I have provided a device which will yield radially whenever the outer casing strikes an abutment, said yielding being through the coil springs B, B', and against the resistance of the springs 18, the rods 13 transmitting the thrust along radial lines.

Having thus described my invention, it is obvious that various immaterial modifications may be made in the same without departing from the spirit of my invention; hence I do not wish to be understood as limiting myself to the exact form, arrangement, construction and combination of parts herein shown and described or uses mentioned.

What I claim as new and desire to secure by Letters Patent is:

1. In a device of the kind described and in combination, a felly adapted to receive an outer casing thereon, an annular series of individual coil springs, each made of a flat piece of metal tapered in width from end to end, and means for supporting said springs on said felly, said supporting means being movable radially of said felly.

2. In a device of the kind described and in combination, a felly adapted to receive an outer casing thereon, an annular series of coil springs on said felly, and adapted to be inclosed by said casing, the adjacent springs of said series being coiled reversely to each other.

3. In a device of the kind described and in combination, a felly adapted to receive an outer casing thereon, an annular series of individual coil springs on said felly, each of said springs being made of a flat piece of metal tapered in width from end to end, the adjacent springs being coiled reversely to each other and adapted to be inclosed by said casing.

4. In a device of the kind described and in combination, a felly adapted to receive an outer casing thereon, an annular series of springs coiled in radial planes, and means for yieldingly supporting said series of springs on said felly.

5. In a device of the kind described and in combination, a felly adapted to receive an outer casing thereon, an annular series of coiled springs about said felly, a relatively rigid annulus surrounding said felly, the ends of the springs being secured to said rigid annulus, and means for yieldingly supporting said annulus on said felly.

6. In a device of the kind described and in combination, a felly adapted to receive an outer casing thereon, an annular ring surrounding said felly, a series of coiled springs having their inner ends secured to said annular ring, radial members secured to said ring, and means for yieldingly supporting said radial members on said felly, whereby an inward movement of said ring will be yieldingly resisted by said yieldable supporting means.

7. In a device of the kind described and in combination, a felly adapted to receive an outer casing thereon, an annular series of coil springs on said felly, an annular ring surrounding said felly, said springs having their inner ends secured to said ring, radial members secured to said ring and extending inwardly thereof, stirrups on said felly, said radial members being slidable through said felly and stirrups, springs between said stirrups and felly to resiliently resist the inward movement of said radial members, and locking means at the free ends of said radial members to limit the outward movement of said radial members.

8. In a device of the kind described and in combination, a felly adapted to receive an outer casing thereon, an annular ring surrounding said felly, an annular series of coiled springs on said felly, having their inner ends secured to said annular ring, radial rods secured to said ring, stirrups arranged on the inner side of said felly, said radial rods extending slidably through said felly and stirrups, radially extending springs between said stirrups and felly to resiliently resist the inward movement of said radial members, said stirrups entirely inclosing said radial springs, and locking means at the free end of said radial members beyond said stirrups to limit the outward movement of said radial members.

9. In a device of the kind described and in combination, a felly adapted to receive an outer casing thereon, a series of springs circumferentially arranged about said felly, a pair of concentric spring rings surrounding said felly, one end of each of said springs being secured to one of said rings and the other end of each of said springs being secured to the other of said rings, and means for resiliently supporting said rings and springs.

10. In a device of the kind described, and in combination, a felly, a series of springs spirally coiled in radial planes arranged annularly about said felly, a common support for all of said springs substantially axially thereof, a locking ring inter-engageable with said felly, and means for detachably securing said locking ring to said felly, whereby the support and attached springs may be removed as an entirety.

11. In a device of the kind described and in combination, a felly rim adapted to receive a yieldable core and an outer casing thereon, a support for said yieldable core and means for detachably securing said support to said felly, said means comprising a locking ring having projections thereon, and adapted to engage in recesses in said felly, and means for detachably securing said locking ring and felly together.

12. In a device of the kind described and in combination, a felly adapted to receive a tire core and detachable radial supports for said core, said felly having radial notches therein through which said radial supports extend, a locking ring having radial projections thereon adapted to enter said notches and retain said radial supports in position, and means for detachably securing said locking ring and felly together.

13. In a device of the kind described and in combination, a felly adapted to receive a tire core, radial supporting rods secured to said core and slidably extending through said felly, means on the inner side of said felly for resiliently supporting said rods, said felly being radially notched to receive said radial rods, a locking ring having radial tongues adapted to enter said radial notches, and means for detachably securing said locking ring to said felly.

In testimony whereof, I have hereunto signed my name in the presence of two subscribing witnesses.

FREDERICK C. MILLER.

Witnesses:
JOHN W. HILL,
BERTHA HARTMANN.